United States Patent [19]

Hamamura

[11] Patent Number: 4,942,910

[45] Date of Patent: Jul. 24, 1990

[54] PROCESS AND APPARATUS FOR MAKING SHAPED CONFECTIONS

[75] Inventor: Akimitsu Hamamura, Utsunomiya, Japan

[73] Assignee: Fantasy Flavors Inc., Wheaton, Ill.

[21] Appl. No.: 928,417

[22] Filed: Nov. 7, 1986

[51] Int. Cl.$^5$ .................... B65B 39/14; A23G 9/00
[52] U.S. Cl. ........................... 141/9; 141/11; 141/82; 141/105; 141/174; 141/181; 141/237; 141/242; 141/250; 141/270; 141/284; 426/516
[58] Field of Search ................. 141/129-191, 141/250-284, 1-12, 100-107, 82, 237, 242; 426/516, 517

[56] References Cited

U.S. PATENT DOCUMENTS

| | | | |
|---|---|---|---|
| 1,801,578 | 4/1931 | Stevens | 426/110 |
| 1,890,069 | 12/1932 | Triolo | 426/110 |
| 2,670,116 | 2/1954 | Johansen | 141/82 X |
| 2,784,566 | 3/1957 | Reynolds | 62/64 |
| 2,784,681 | 3/1957 | Orrell | 141/279 X |
| 2,866,420 | 12/1958 | Nutty | 426/515 |
| 2,934,872 | 5/1960 | Wise | 141/103 X |
| 3,267,971 | 8/1966 | Mueller | 141/270 X |
| 3,347,287 | 10/1967 | Geber | 141/105 |
| 3,408,960 | 11/1968 | Stanley | 425/113 |
| 3,865,281 | 2/1975 | Byrd et al. | 141/174 X |
| 4,155,689 | 5/1979 | Getman | 425/114 |
| 4,325,221 | 4/1982 | Grewar | 62/64 |
| 4,504,511 | 3/1985 | Binley | 426/565 |
| 4,548,045 | 10/1985 | Altares et al. | 62/63 |
| 4,615,264 | 10/1986 | Rose | 118/25 |

FOREIGN PATENT DOCUMENTS 59196088 2/1971 Japan .
59290 11/1972 Japan .
57-15856 3/1981 Japan .

*Primary Examiner*—Ernest G. Cusick
*Attorney, Agent, or Firm*—Willian Brinks Olds Hofer Gilson & Lione

[57] ABSTRACT

A process and apparatus for making a shaped frozen confection. The apparatus has a plurality of nozzles for extruding the shaped confection in a variety of contoured shapes. The nozzles simultaneously move in a vertical direction and circularly in a horizontal direction, thereby moving in a spiral path to produce a spirally-shaped frozen confection. A variety of differently shaped frozen confections can be made by varying the rate of extrusion from the nozzles, or the rate or direction of vertical movement of the nozzles.

23 Claims, 7 Drawing Sheets

PROCESS AND APPARATUS FOR MAKING SHAPED CONFECTIONS

FIELD OF THE INVENTION

This invention relates to a process and apparatus for making shaped confections, as well as packaged shaped confections made thereby, and is particularly directed to a process and apparatus for producing on a large scale frozen confections having specially configured shapes, such as shaped confections of ice cream or other comestibles. More particularly the present invention is directed to a process and apparatus for mass producing ice cream cones, and a packaged ice cream cone made thereby.

BACKGROUND OF THE INVENTION

The present invention is an improvement upon processes and devices for mass producing shaped confections, such as ice cream cones. Frozen confections, for example, are presently manufactured by a variety of processes and devices. U.S. Pat. No. 2,866,420, for example, discloses a device for extruding a frozen confection, in which a mold for receiving the frozen confection is simultaneously lowered and rotated with respect to a stationary nozzle.

Another type of device for extruding a frozen confection is disclosed in U.S. Pat. No. 1,890,069. This device has a plurality of nozzles which move in a circular pattern. The nozzles are caused to move in a circular pattern by means of two arms connected to the table which oscillate perpendicularly to each other. A platform for supporting a container for receiving the extruded frozen confection is lowered and raised while the nozzles move in the circular pattern, thereby creating a spirally-shaped frozen confectionary product.

U.S. Pat. No. 4,504,511 discloses a process for preparing a spirally-shaped frozen confection. In this process the frozen confection is extruded from a rotating extension nozzle directly onto an elongated moving conveyor. The spiral shape is caused by the relative movement between the material leaving the rotating extrusion nozzle and the moving conveyor.

SUMMARY OF THE INVENTION

The device of the present invention comprises a plurality of nozzles for extruding a confection in a variety of configured shapes. The nozzles are supported by a table. A container is placed below each nozzle to receive the extruded product. Means is provided for simultaneously moving the table (and thereby the nozzles) vertically and horizontally while extruding the confectionary material into the stationary container. The nozzles are thereby caused to move in unison in a configured path to produce a shaped confection. Suitable containers include a wide variety of items including cups, edible cones, wrappers, molds, and the like.

Because the confections of the present invention must be extruded at temperatures at which the material is soft, and therefore extrudable, the contours of the final product can be easily damaged in handling. It is therefore desirable to rapidly freeze the final product to retain its shape immediately after the frozen confection has been extruded. A conveyor system moves the containers filled with the confectionary material from the filling area to the freezing area, where the surfaces of the confections are frozen hard. The presently preferred method of freezing the extruded product is to subject it to a cryogenic liquid, such as liquid nitrogen, immediately after the extrusion stage. Subjecting the product to a cryogenic liquid hardens the surface of the frozen material so that it can be handled without damaging the shaped product. This is particularly advantageous where the frozen material has fine contours that could be easily damaged.

In one embodiment the table is moved circularly in a horizontal plane by means of an eccentric wheel having a vertical axis of rotation and an offset axis to which the table supporting the nozzles is attached. When the wheel rotates about the vertical axis, the offset axis travels in a circular path, thereby causing horizontal circular movement of the table and nozzles.

The table is simultaneously moved in a vertical direction by means of an eccentrically-shaped cam connected to a shaft supporting the table. The eccentrically-shaped cam enables the shaft and table to move vertically at a variety of speeds and directions during the extruding cycle. Because the cam can be a variety of shapes, the shape of the frozen confection can likewise be altered.

The simultaneous vertical and horizontal movement of the table causes the nozzle to travel in a configured path while it is extruding the frozen confection. Variables such as nozzle rotation speed, speed of vertical movement, shape of the eccentric cam, extrusion rate, nozzle shape, and the like can be adjusted to make a wide variety of shaped products. This variation is desirable, particularly where the aesthetic appeal of the product is important to consumers.

The device and process of the present invention are capable of mass-producing shaped confections. Further, the device and process are capable of producing a variety of shapes, according to the demand of consumers. This is particularly important where the economic success of a product depends on its aesthetic appeal to consumers.

Another important advantage of the device and process of the present invention is that it can mass-produce an ice cream cone similar to a hand-filled soft-serve ice cream cone. As a result, ice cream cones can be commercialized on a large scale and can be more conveniently made available to consumers. The containers for the ice cream cones make it possible to market the ice cream cones of the present invention to consumers on a large scale.

The foregoing features and advantages of the present invention will be more readily understood upon consideration of the following detailed description of the presently preferred embodiments taken in conjunction with the accompanying drawings, in which:

DETAILED DESCRIPTION OF A PREFERRED EMBODIMENT

Figure 1:
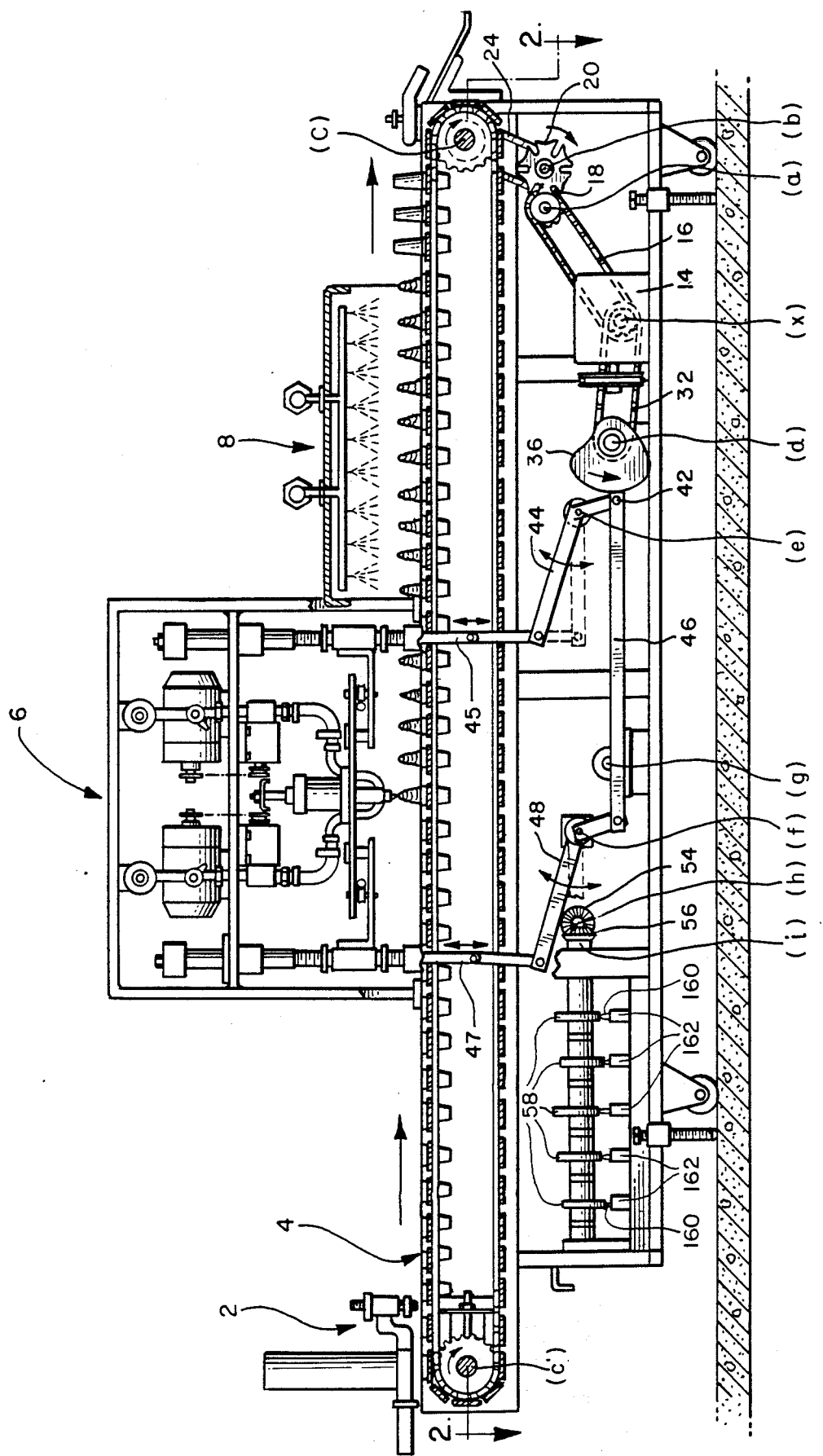
FIG. 1 is a side view of the preferred device of the present invention.

Referring to the drawings, FIG. 1 shows the general structure of the preferred embodiment of the filling device of the present invention. A container dispenser 2 deposits containers on the conveyor 4. The containers may also be deposited manually. The containers are then moved by the conveyor to the filling assembly 6 where they are filled with a frozen confectionary material, such as ice cream. The filled containers are then moved to the freezing chamber 8 where they are subjected to a super-cooled liquid which causes the surface of the soft frozen confectionary material to freeze. The frozen confection can then be handled and placed in a storage area for more complete freezing. As will be readily appreciated, the device of the present invention may also be utilized to extrude other non-frozen comestibles, such as whipping cream, jams, jellies, etc. Such use is intended to be within the scope of the present invention.

Suitable containers include a wide variety of items including cups, edible cones, wrappers, molds, and the like. In a particularly preferred embodiment of the present invention, illustrated in FIGS. 6a-6c, the container comprises an edible cone 130 positioned in an exterior plastic cup 132 having an exterior cover 134 that surrounds and protects the shaped confection 136. The cup substantially conforms to the shape of the outer surface of the edible cone, thus preventing movement of the shaped confection in the container which could damage the edible cone or shaped confectionary material. As seen in the drawings, the cup is in the shape of two stacked frustoconical sections of different size, conforming to the shape of the common cone made for holding ice cream.

Figure 6C:
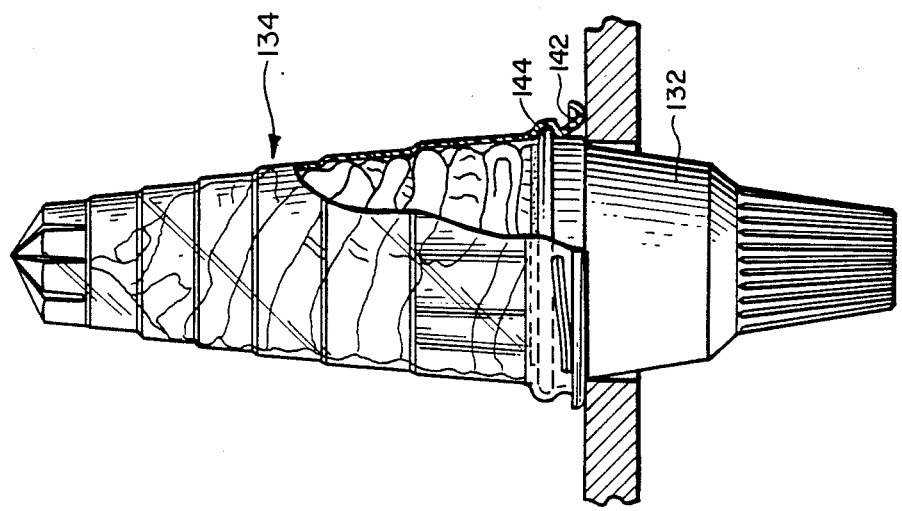
FIGS. 6a–c are side views of a container for an ice cream cone made with the preferred device of the present invention.
Figure 6B:
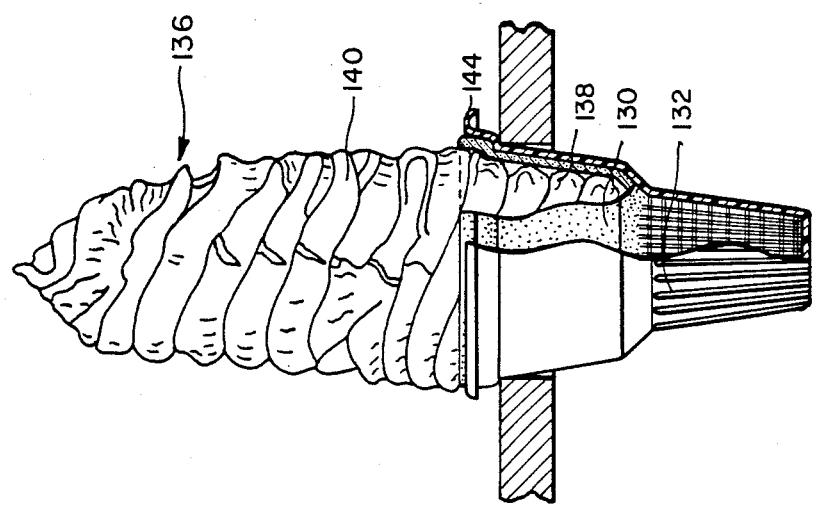
Figure 6A:
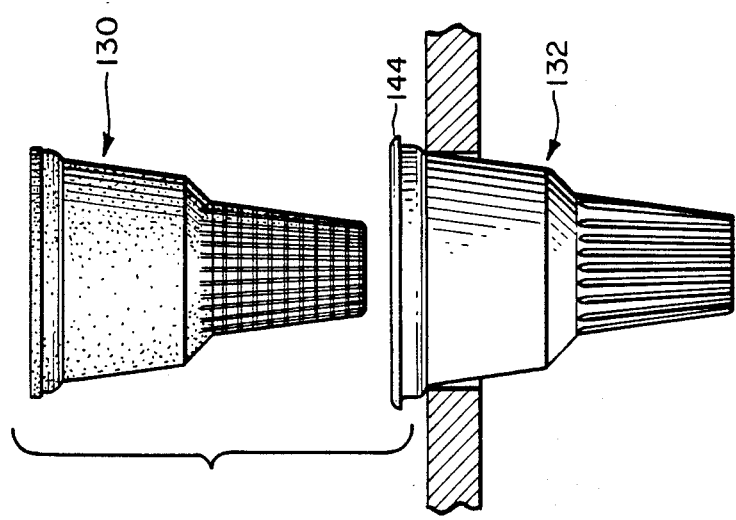

The cup/cone of FIG. 6a is placed on the conveyor 4 (shown in FIG. 1), where it is then transported to the filling device 6. As seen in FIG. 6b, a confectionary material, such as ice cream, is extruded from the filling device into the edible cone. Although the confectionary material may be filled just to the top of the edible cone or other container, the shaped confectionary material of the present invention can be appreciated most when the confectionary material is filled above the top of the container where it is visible to the consumer. It is highly desirable that the shaped confections of the present invention be visible to consumers who make purchasing decisions based on aesthetic appeal of the food product, for example, a product having a stack of confectionary material extending above the cup to a height at least the height of the cup. Accordingly, in the preferred embodiments of the present invention, the confectionary material protrudes to a height well above the top of the container. As seen in FIG. 6b, the confectionary material 136 thus has a bottom portion 138 contained within the edible cone, and a top portion 140 which protrudes above the top of the edible cone a distance, for instance, greater than the height of the cup. It has been found, for example, that as much as about 70% to 80% by volume of the total confectionary material extruded can be above the edible cone.

Damage to the soft confectionary material is avoided by placing the exterior cover 134 over the confection, preferably after its outer surface has been frozen by being subjected to a cryogenic liquid. The exterior cover 134 surrounds and protects the top portion of the shaped confectionary material protruding above the top of the edible cone while the product is being distributed to consumers. This exterior cover preferably conforms generally to the shape of the top portion of the confectionary material. FIG. 6c, for example, shows the cover generally shaped like the frustum of a conical section, thus generally conforming to the shape of the shaped confectionary material. As explained above, the cone is stacked above the cup, so that the height of the cover, for example, will be greater than the height of the cup. Although some space between the confectionary material and the cover is desirable, it has been found that after the confectionary material is frozen, as would be the case where ice cream is used, the exterior cover may touch some outer edges of the shaped confectionary material without adversely affecting the aesthetic qualities of the shaped confectionary material. Means is provided for securing the exterior cover to the exterior cup holding the edible cone and confectionary material. Such means would include, for example, ridges or depressions that would allow the cover to either snap or screw on the cup. FIG. 6c shows a series of threadlike ridges 142 on the inside of the cover that are forced over the lip 144 of the plastic cup in a screw-like fashion, thus securing the cover on the cup.

The exterior cup 132 and exterior cover 134 are made of a thermo-plastic material, such as polyethylene or polypropylene. This plastic material should be at least sufficiently rigid that normal handling of the packaged shaped confection does not seriously damage either the edible cone or the confectionary material contained therein. The plastic material should also be at least sufficiently resilient that normal handling not cause the plastic material to break or crack open. Also, in order to maximize the visibility of the shaped confectionary material inside the container, the exterior cover is preferably translucent or transparent.

Figure 2:
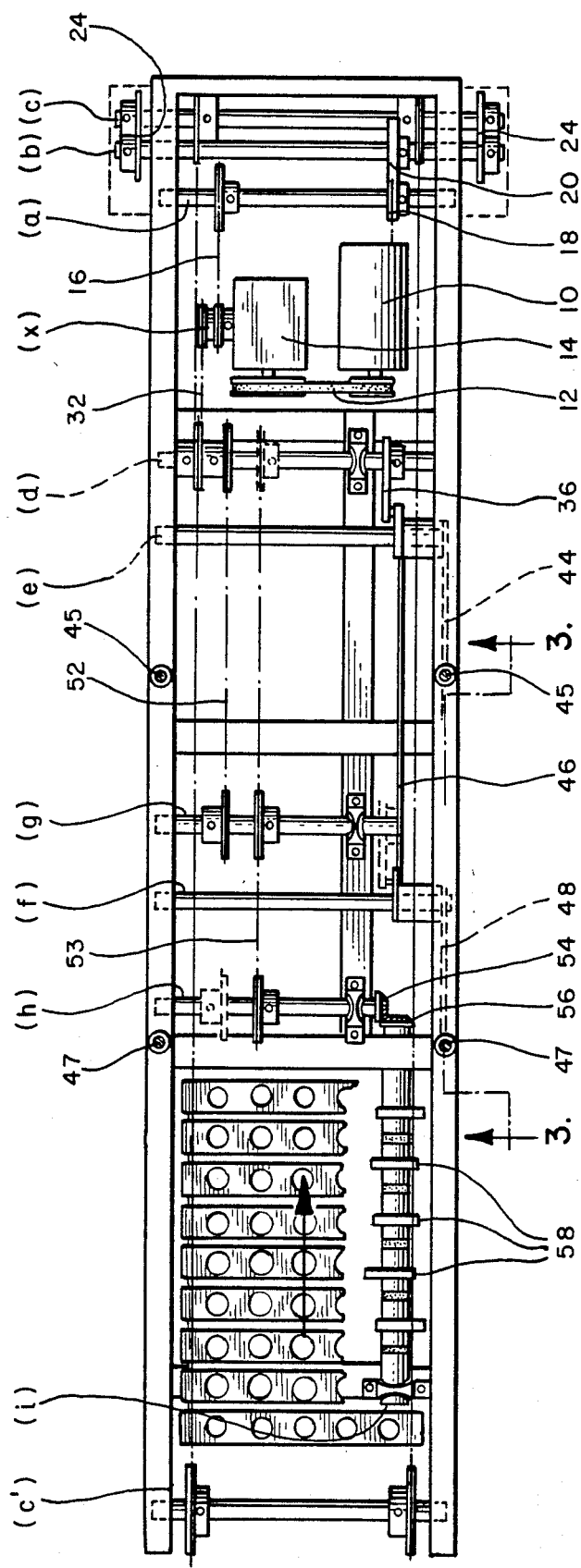
FIG. 2 is a top view of the lower driving mechanisms of the device shown in FIG. 1.

Referring now to the apparatus of the present invention, FIG. 2 shows a top view of the driving mechanisms which synchronize the movements of the preferred device of the present invention. The drive motor 10 transmits power to a reducer 14 by means of a v-belt 12. The reducer 14 regulates the speed of output shaft (x). As shown in both FIGS. 1 and 2, the output shaft (x) and the geneva star wheel shaft (a) are connected by chain 16. Geneva star wheel 18 mounted on shaft (a) connects with geneva cam 20 mounted on the geneva cam shaft (b). The geneva cam shaft (b) is connected to the conveyor shaft (c) by chain 24. The geneva gear thereby transmits intermittent movement to the conveyor and feeds the containers at predetermined spacing. The timing of the movement of the conveyor is adjusted so that the conveyor is stationary while confectionary material is being extruded from the filling device, and then, after extrusion has stopped, moves the next empty container into position.

Output shaft (x) of reducer 14 also turns cam shaft (d) through chain 32. The shutter valve up/down cam 36 is mounted to the other end of cam shaft (d). As cam shaft (d) turns, cam 36 turns, causing cam 36 to engage cam roller 42 which is mounted to pivoting bar 44. Pivoting bar 44 thereby pivots about pivoting shaft (e), and the tip of pivoting bar 44 performs an up/down movement, thus causing the shutter valve up/down shaft 45 to move vertically. As can be seen in FIG. 2, the two ends of pivoting bar 44, that is, the end connected with the up/down shaft and the end contacting cam 36 on which the cam roller 42 is mounted, are offset from each other along shaft (e). Each end of pivoting bar 44 pivots about shaft (e). Connecting bar 46 may be mounted on the pivoting bar 44 to connect to a second pivoting bar 48 which pivots about shaft (f). In this case the tip of the second pivoting bar 48 also moves up and down, thus causing the connected shutter valve up/down shaft 47 on the other side to move up and down in unison with the first up/down shaft 45. As will be described in more detail below, the vertical movement of shutter valve up/down shafts 45 and 47 cause the nozzle, from which a confectionary material is extruded, to move up and down.

In an alternative embodiment, the shutter valve up/down shafts 45 and 47 may be controlled independently by removing the connecting bar 46, and connecting shaft (d) to shaft (g) with chain 52, and attaching a second cam (not shown) to the end of shaft (g) which operates similar to the cam on shaft (d). It is desirable in some instances to have the up/down shafts move independently, particularly where separate filling devices are mounted on each shaft. Separate filling devices would be used, for example, to extrude different flavors of frozen confection in a layered arrangement. The separate filling arrangement would also be useful to extrude a frozen confection from one nozzle, and extrude a topping on the frozen confectionary material from the second nozzle.

It is also preferable that means be provided to regulate the rate of extrusion of the frozen confection. FIG. 2 shows shaft (d) and shaft (g) connected by chain 52. Shaft (g) is then connected to shaft (h) by chain 53. As seen in both FIGS. 1 and 2, bevel gear 54 mounted on the end of shaft (h) meshes with a second bevel gear 56 located on the end of shaft (i), thus connecting shafts (h) and (i) which are perpendicular to one another. Shaft (g) thus transmits turning power to shaft (i) through shaft (h) and the bevel gears. Consequently, matching cams 58 mounted to shaft (i) turn, pushing and releasing the rollers 160 located on the machine operating valves 162. The machine operating valves 162 in turn controls the flow of compressed air that regulates the rate of extrusion of the confectionary material. As will be readily appreciated by those skilled in the art, varying the rate of extrusion of the confectionary material will result in differently shaped confections. Rapid extrusion rates will result in thicker columns of confectionary material, while slow extrusion rates will result in thinner columns of confectionary material. Of course, it is possible to vary the rate of extrusion of the confectionary material during a single filling of a container, thereby varying the thickness of the confectionary material. Accordingly, an endless of variety of shaped confections can be produced.

The timing of the shutter valve up/down shafts 45 and 47, and the rate of extrusion of the confectionary material, can be synchronized to create different configurations of extruded products. This alteration can be done by simply changing the configuration of the shutter valve up/down cam 36 to correspond with the desired configuration of the product. Likewise, by adjusting the matching cams 58 on shaft (i), the rate of extrusion can be changed to alter the configuration of the product.

Figure 3:
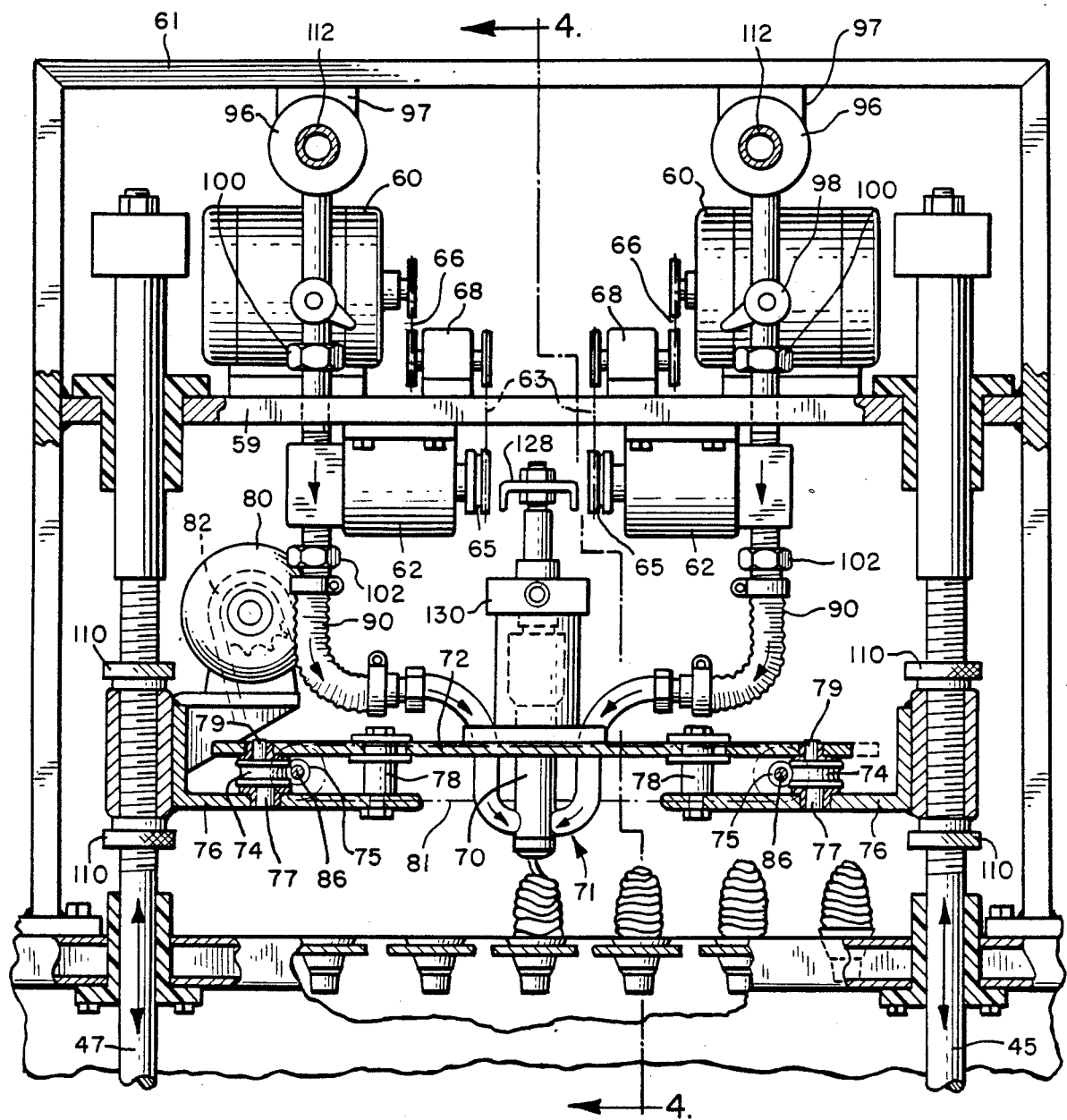
FIG. 3 is a detailed side view of the filling assembly of the device shown in FIG. 1.
Figure 4:
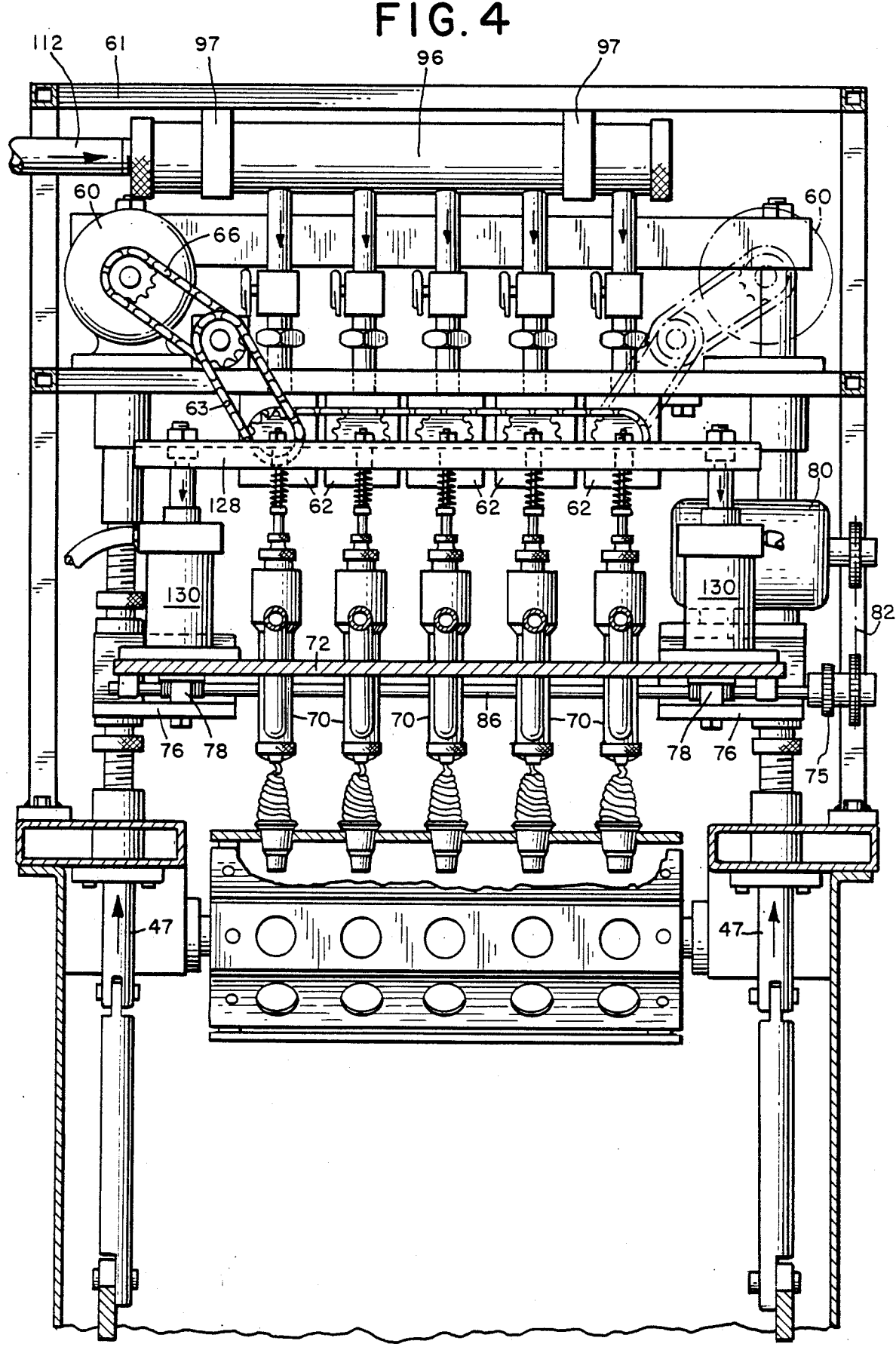
FIG. 4 is an end view of the filling assembly of the device shown in FIG. 1.

The filling device of the present invention is shown from a side view in FIG. 3 and a front view in FIG. 4. Left and right flow control motors 60 are mounted on a support shelf 59 which is secured to the left and right sides of the upper section of the frame 61. Flow control pumps 62 for each nozzle 64 are secured to the underside of the support shelf 59. The flow control motors 60 transmit movement to a reducing gear 68 by chain 66. The reducing gear 68 in turn transmits movement to one flow control pump 62 by chain 63. This single flow control pump to which chain 63 is connected then transmits movement to the other flow control pumps by chain 65. The flow control pumps 62 are regulated, for example, either by the matching cams 58 (see FIGS. 1 and 2) or, alternatively, the flow control motor may be regulated by a speed control regulator (not shown).

Referring to the upper portion of the filling assembly in FIGS. 3 and 4, a dual extrusion system is shown in which two different kinds of confectionary material can be accommodated. Accordingly, the dual passageways for transporting the confectionary material from the inlet to the nozzles are similar, being mirror images of each other.

Figure 5:
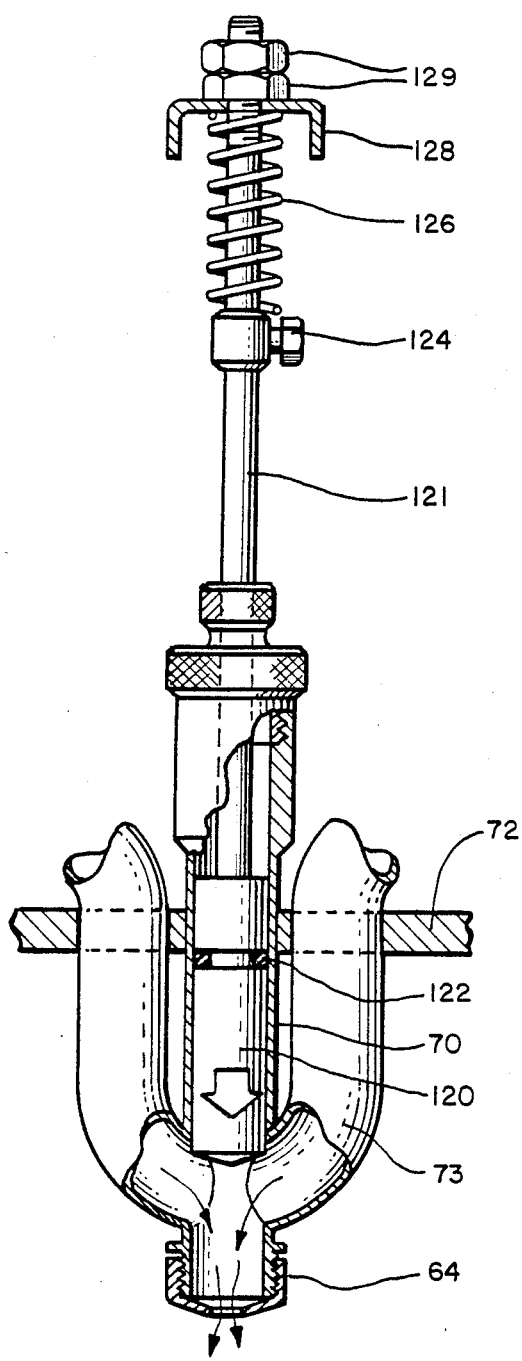
FIGS. 5 and 5a show the filling valve of the device shown in FIG. 1 in an open and closed position.

The frozen confectionary material enters through the inlet 112 and passes into the header 96. The header is supported from the frame 61 by hanging support rods 97. The frozen confectionary material is then transported through the header 96 and the 2-way cock 98 to the pump 62 which is connected to the cock 98 by connecting nuts 100 and to the flexible hose 90 by connecting nuts 102. Frozen confectionary material is then transported through the flexible pressure hose 90 by means of the pump 62 to the filling valve 71. The filling valve is described in more detail below with reference to FIGS. 5 and 5a. The amount of frozen confection transported in any given unit of time is determined by the speed of rotation of the pump 62. As seen in FIG. 5, fine adjustments to the amount of extruded confectionary material can be made by adjusting the double nuts 129 of the shutter valve spring adjustment screw 124 and spring 126.

Referring now to the lower portion of the filling assembly in FIGS. 3 and 4, the filling valve main body 70 and filling valve tubing 73 are mounted on the nozzle turn table 72. The nozzle turn table therefore controls the motion of the nozzle 64. L-shaped brackets 76 are mounted to the up/down shafts 45 and 47, and support an eccentric worm gear 74 driven by worm 75. Adjustable fastening nuts 110 on the up/down shafts allow the height of the L-shaped brackets 76 to be adjusted. The worm wheel on the L-shaped brackets has a lower axis 77 about which the wheel is rotated, and an upper axis 79 that is parallel to but offset from the axis of rotation. Thrust receivers 78 are provided to remove the weight load from the eccentric worm gear 74. The drive from the nozzle turning motor 80 is transmitted to the left eccentric worm gear 74 through V-belt 82, worm shaft 86, and worm 75. The right eccentric worm gear 74 is driven by chain 81, connecting left and right worm shafts 86. As the worm gear 74 is turned about the lower axis of rotation, the offset upper axis is caused to rotate in a circular horizontal pattern. When the offset upper axis is connected to the turn table 72, the turn table will also move horizontally in a circular pattern, thereby causing all the nozzles 64 to move in unison in a circular pattern.

Simultaneous with this circular movement of the turn table is the vertical movement caused by the up down movement of the up/down shafts 45 and 47, on which the turn table is supported. The combined horizontal circular movement and vertical movement of the nozzles result in a spirally-shaped extruded confectionary material. The rate and direction of vertical movement of the filling device is controlled by the shape of cam 36. By varying the rate and direction of the filling device, the shape of the extruded confectionary material is changed. For example, increasingly rapid upward movement of the filling device results in a shaped confectionary material which is more narrow at the top. If the movement is sufficiently rapid, peaks can be formed at the top of the confectionary material. It will be readily appreciated by those skilled in the art that many variables of the present invention can be adjusted or varied, such as extrusion rate, nozzle rotation speed, rate of vertical movement, etc. Accordingly, it is possible to make an endless variety of shaped confectionary products.

The filling valve main body 70 and filling valve tubing 73 are integrally connected to the nozzle turn table 72. Flexible pressure hoses 90 connect the stationary upper filling valve assembly to the moving lower filling valve assembly by means of connecting nuts 102. Because these hoses are flexible, the table and lower filling valve assembly can move relative to the stationary upper filling valve assembly.

Figure 5A:
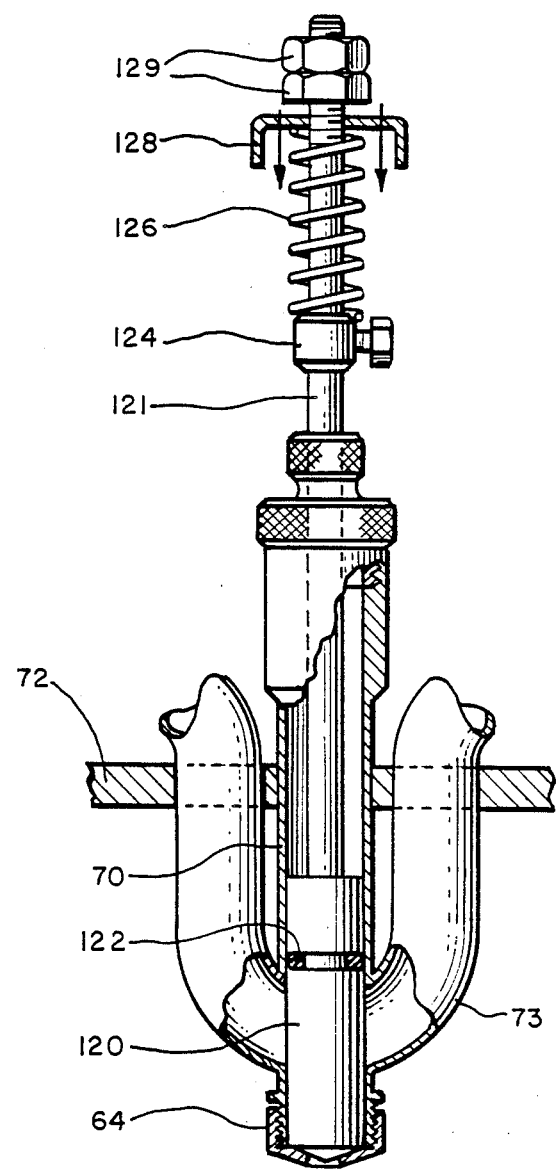

FIGS. 5 and 5a show detailed views of the filling valve in open and closed positions. FIG. 5, in the open position, shows the filling valve main body 70 which houses a shutter valve 120. As the shutter valve moves up the nozzle is opened to allow passage of the frozen confectionary material through the tubing 73 and out the nozzle 64. The shutter valve o-ring seal 122 prevents leakage of the frozen material into the valve. On the upper portion 121 of the shutter valve 120 is a spring adjustment screw 124, spring 126, open-close plate 128, and double nuts 129. The open-close plate is caused to move up and down by the pneumatic cylinder 130 (shown in FIGS. 3 and 4). Thus, when the filling valve assembly is in the down position (ready to begin extruding the frozen material), the pneumatic cylinder is actuated to cause the open-close plate to rise, which in turn causes the shutter valve to rise, thereby opening the nozzle 64 through which the frozen material is extruded.

As seen in FIG. 5a, the extrusion is stopped when the pneumatic cylinder lowers the open-close plate, causing the shutter valve to close the outlet through which the frozen material is being extruded. The spring adjustment screw 124 supports the spring 126 which absorbs the impact of the open-close plate 128 when it is lowered.

It should be noted that the dual tubing 73, through which the confectionary material passes, communicates with independent inlets 112. Accordingly, in one alternative embodiment, two separate confectionary materials having different colors, flavors, textures, etc. pass through each inlet. The different confectionary material combines together just prior to being extruded from the nozzle; thus, the confectionary material will not be homogenously mixed, but will have a swirled or marbled appearance according to the different qualities of the separate confectionary material, in addition to shape imparted by the movement of the nozzle.

The freezing chamber 8, shown in FIG. 1, is used to spray a cryogenic liquid on the confectionary material in order to harden its surface. Soft extrudable ice cream, for example, has a temperature in the range of about 6° C.-7° C. Liquid $N_2$, a non-toxic cryogenic liquid, has a temperature of about $-173°$ C. Sprayed directly at the ice cream in a gaseous phase, the $N_2$ freezes the surface of the ice cream, forming a frozen shell. The surface of the shell attains a temperature of about $-15°$ C., thus imparting stiffness to the ice cream. The liquid $N_2$ process has been found to be necessary when the ice cream stack above the top of the edible cone reaches a height greater than about 16 cm, and is particularly important when the shape of the confectionary material has deep folds or fine contours. Liquid $N_2$ is applied for approximately ten seconds, depending on the height of confectionary material and the extent of grooves or contours.

The operation of the presently preferred embodiment of the apparatus of the present invention will be clear from the following description. The apparatus described herein is designed to operate continuously to mass-produce shaped confections. A container is placed in a receptacle of the conveyor 4 either manually, or automatically by a feeder device 2. The drive motor 10 operates continuously, but imparts intermittent movement to the conveyor through the geneva gear 18 and 20, thus moving the container on the conveyor beneath the nozzle 64. The period during which the conveyor 4 is stationary is synchronized with the extrusion period of the filling device so that the container is located directly beneath the nozzle 64 while the confectionary material is being extruded from the nozzle. After the container is filled, the conveyor then moves the filled container intermittently to the freezing chamber 8, where the confection is subjected to a super-cooled liquid for freezing the surface of the confectionary material. The confection is then transported by the conveyor to the end of the line where a cover is placed on the confection and it is manually removed from the conveyor and stored for distribution to consumers.

Focusing now on the operation of the filling device, a single cycle in the extrusion process will be described. As mentioned above, the containers are indexed with the nozzle 64, so that the nozzle is directly above the container while it extrudes the confectionary material. Accordingly, the conveyor will be stationary during the extrusion stage, but will move between extrusion cycles in order to advance empty containers to beneath the nozzle. The nozzle is lowered and raised by the action of the cam 36 on the up/down shafts 45 and 47, while at the same time the nozzle moves circularly in a horizontal plane by the action of the eccentric worm wheel 74. At the beginning of the extrusion cycle, the filling device is in the raised position, and the pneumatic cylinder 130 lowers shutter valve 120, closing the outlet for the confectionary material. The rotation of cam 36 causes the up/down shafts 45 and 47, and hence the nozzles, to be lowered. When the filling device is in the lowered position, the pneumatic cylinder 130 raises shutter valve 120, opening the outlet for the confectionary material. At this point the confectionary material is allowed to exit the nozzle, while the nozzle is raised vertically and moved circularly in a horizontal plane. The combined vertical and circular movement of the nozzle during the extrusion results in a spirally-shaped extruded confection. At a predetermined position, determined according to the desired height of the finished product, the pneumatic cylinder 130 lowers shutter valve 120, closing the outlet and terminating the extrusion of the confectionary material. The conveyor then advances the next row of containers into position for receiving the confectionary material. This cycle is then repeated until the desired number of frozen confections have been produced.

Figure 9:
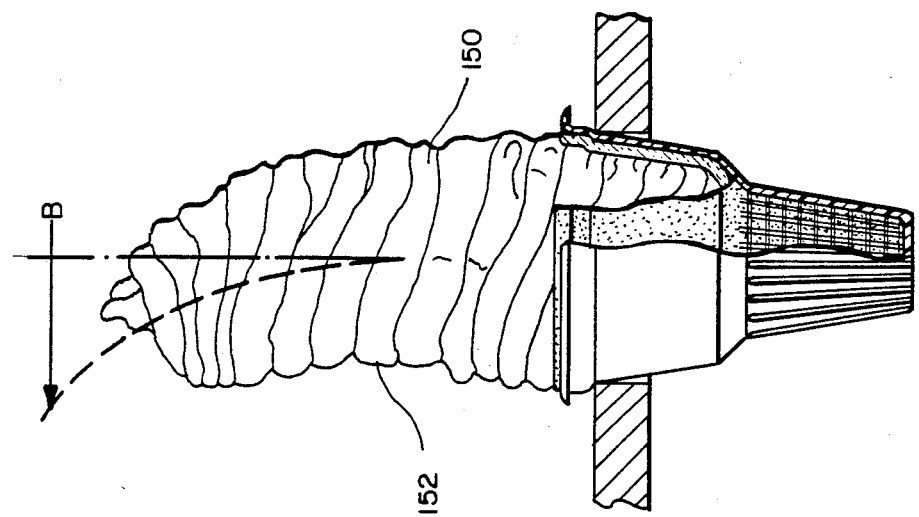
FIG. 9 shows the frozen confection of FIG. 8 having received greater amounts of confectionary material on the right side than on the left side.
Figure 8:
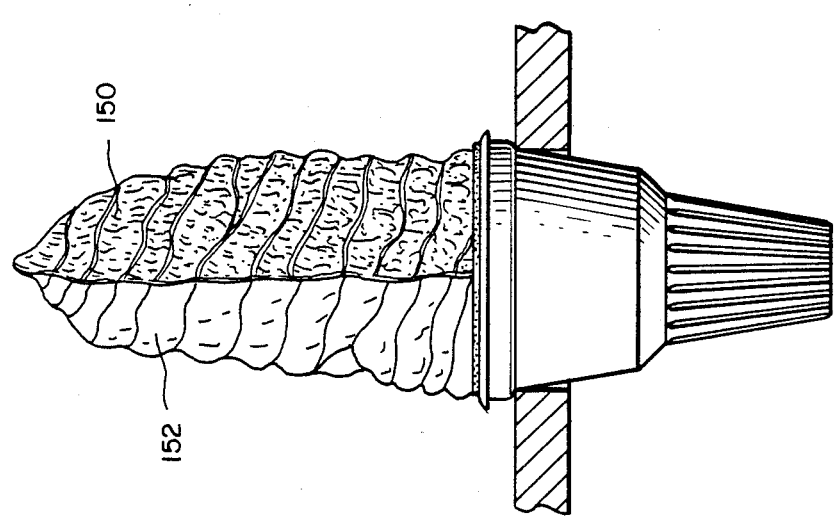
FIG. 8 shows a frozen confection having different flavors of confectionary material on left and right sides.
Figure 7:
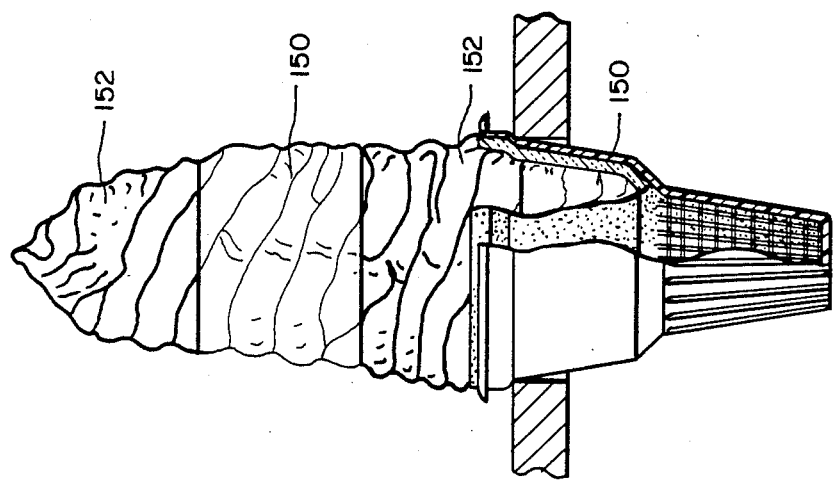
FIG. 7 shows a frozen confection having stacked alternating flavors of frozen confectionary material.

The design of the shaped confection can be changed by varying the rate of extrusion of the confectionary material, altering the shapes of the cams to vary the vertical speed of the nozzle, or varying the horizontal rotational speed of the nozzle. Other modifications can be made to change the design of the shaped confection. For example, different nozzle orifice shapes would change the contours of the shaped product. In addition, as mentioned above, different flavored confectionary material can be used in the dual passageways of the filling device to give variety to the color and flavor of the shaped confection. Further, by alternately operating the left and right flow control pumps 62 separately, different flavors of confectionary material can be stacked in a layered fashion. FIG. 7 shows an ice cream confection in which the left and right flow control pumps 62 alternately extrude, for example, a chocolate flavor 150 and a strawberry flavor 152, thereby stacking the different flavors in layers. Each flavor is extruded for several rotations of the nozzle 64. In another variation, shown in FIG. 8, the left and right flow control pumps 62 alternate for one half rotation of the nozzle 64. Because each flavor is alternately extruded for one half rotation of the nozzle 64, one side of the ice cream is always, for example, chocolate flavor 150, while the opposite side is always strawberry flavor 152. It is particularly important in this embodiment to assure that the left and right flow control pumps extrude an equivalent amount (i.e. an equivalent thickness) of frozen confectionary material per half revolution. Failure to extrude equivalent amounts of frozen confectionary material will result in a stacked frozen confection, such as shown for example in FIG. 9, which curves to the left side in the direction of arrow B as a result of the right side receiving more confectionary material than the left side and thereby causing the stacked frozen confection to curve. In most cases this is aesthetically unpleasant. In addition, the exterior cover 134 could not be applied without damaging the stacked confectionary material. Many other variations will be apparent to those skilled in the art.

The foregoing disclosure is the best mode devised by the inventor for practicing this invention. It is apparent, however, that apparatus and methods incorporating modifications and variations will be obvious to one skilled in the art. For example, one skilled in the art will readily appreciate that alternative means can be devised for raising and lowering the nozzles of the filling device of the present invention. Likewise, alternative means can be devised for causing the nozzles to move horizontally in either a circular or non-circular pattern. It will also be readily appreciated by one skilled in the art that many of the functions of the presently preferred embodiment of the present invention can be accomplished manually. For example, variations in the extrusion rate regulated by cams 58 can be regulated manually or otherwise. Inasmuch as the foregoing disclosure is intended to enable one skilled in the pertinent art to practice the instant invention, it should not be construed to be limited thereby, but should be construed to include such modifications and variations as fall within its true spirit and scope.

I claim:

1. A process for making a shaped confection comprising the steps of:
   extruding a confectionary material from a plurality of nozzles;
   intermittently moving a plurality of containers to a stationary position under said plurality of nozzles for receiving the confectionary material extruded therefrom;
   moving said plurality of nozzles in a vertical direction and laterally in a horizontal direction while extruding the confectionary material into the plurality of containers, whereby the plurality of nozzles move in a predetermined path and extrude a shaped confection in each of the containers in said plurality of containers.

2. A process for making a shaped confection as in claim 1, further comprising the step of varying the rate of extrusion of the confectionary material.

3. A process for making a shaped confection as in claim 1, further comprising the step of moving the plurality of nozzles in a vertical direction at a varying rate of speed.

4. A process for making a shaped confection as in claim 1, further comprising the steps of controlling the flow of said confectionary material from a right flow control pump and a left flow control pump to each of said plurality of nozzles, and alternately operating the left and right flow control pumps separately.

5. A process for making a spirally-shaped confection comprising the steps of:
   extruding a confectionary material from a plurality of nozzles;
   supporting said plurality of nozzles on a support means for moving said plurality of nozzles in unison;
   intermittently moving a plurality of containers to a stationary position below said plurality of nozzles for receiving the confectionary material extruded therefrom;
   moving said support means in a vertical direction and substantially circularly in a horizontal plane while extruding the confectionary material into the plurality of containers whereby said plurality of nozzles move in a spiral path and extrude a spirally-shaped confection in each of the containers in said plurality of said containers.

6. A process for making a shaped confection as in claim 5, further comprising the step of varying the rate of extrusion of the confectionary material.

7. A process for making a shaped confection as in claim 5, further comprising the step of moving the support means in a vertical direction at a varying rate of speed.

8. A process for making a shaped confection as in claim 5, further comprising the steps of controlling flow of said confectionary material from a right flow control pump and a left flow control pump to each of said plurality of nozzles, and alternately operating the left and right flow control pumps separately.

9. A process for making a shaped confection comprising the steps of:
   extruding a confectionary material from a plurality of nozzles;

connecting said nozzles to a support means for supporting and moving said plurality of nozzles in unison;

moving said support means in a vertical direction and substantially circularly in a horizontal plane while extruding the confectionary material into a plurality of containers, whereby said plurality of nozzles move in a spiral path and extrude a spirally-shaped confection;

providing a plurality of pumps communicating with said plurality of nozzles;

providing flow of said confectionary material by means of said plurality of pumps communicating with said plurality of nozzles;

intermittently moving a plurality of containers to a stationary position below said plurality of nozzles for receiving the confectionary material extruded therefrom.

10. A process for making a shaped confection as in claim 9, wherein the plurality of pumps communicating with said plurality of nozzles vary the rate of extrusion of the confectionary material.

11. A process for making a shaped confection as in claim 9, further comprising the step of moving the support means in a vertical direction at a varying rate of speed.

12. A process for making a shaped confection as in claim 9, further comprising the steps of controlling flow of said confectionary material from a right flow control pump and a left flow control pump to each of said plurality of nozzles, and alternately operating the left and right flow control pumps separately.

13. The process of claims 1, 2, 3, 5, 6, 7, 9, 10 or 11, further comprising the step of immediately subjecting the confection to a cryogenic liquid, whereby the surface of the extruded confection is frozen.

14. A device for making a shaped confection comprising:
 a plurality of nozzles for extruding a confectionary material;
 means for intermittently moving a plurality of containers to a stationary position under said plurality of nozzles for receiving the confectionary material extruded therefrom;
 means for moving said plurality of nozzles in a vertical direction and means for moving said plurality of nozzles laterally in a horizontal direction while extruding the confectionary material into the plurality of containers, whereby the plurality of nozzles move in a predetermined path and extrude a shaped confection.

15. A device for making a shaped confection as in claim 14, further comprising means for varying the rate of extrusion of the confectionary material.

16. A device for making a shaped confection as in claim 14, further comprising means for moving the plurality of nozzle in a vertical direction at a varying rate of speed.

17. A device for making a spirally-shaped confection comprising:
 a plurality of nozzles for extruding a confectionary material;
 support means connected to said plurality of nozzles for supporting and moving said plurality of nozzles in unison;
 conveyor means for intermittently moving a plurality of containers to a stationary position below said plurality of nozzles for receiving the confectionary material extruded therefrom;
 means for moving said support means in a vertical direction and substantially circularly in a horizontal plane while extruding the confectionary material into the plurality of containers, whereby said plurality of nozzles move in a spiral path and extrude a spirally-shaped confection.

18. A device for making an extruded confection as in claim 17, further comprising means for varying the rate of extrusion of the confectionary material.

19. A device for making an extruded confection as in claim 17, further comprising means for moving the support means in a vertical direction at a varying rate of speed.

20. A device for making a shaped confection comprising:
 a plurality of nozzles for extruding a confectionary material;
 support means connected to said plurality of nozzles for supporting and moving said plurality of nozzles in unison;
 means for moving said support means in a vertical direction and substantially circularly in a horizontal plane while extruding the confectionary material into a plurality of containers, whereby said plurality of nozzles move in a spiral path and extrude a spirally-shaped confection,
 a plurality of pumps each communicating with said a respective one of the plurality of nozzles for providing flow of confectionary material;
 conveyor means for intermittently moving said plurality of containers to a stationary position below said plurality of nozzles for receiving the confectionary material extruded therefrom.

21. A device for making an extruded confection as in claim 20, wherein the plurality of pumps communicating with said plurality of nozzles vary the rate of extrusion of the confectionary material.

22. A device for making an extruded confection as in claim 20, further comprising means for moving the support means in a vertical direction at a varying rate of speed.

23. The device of claims 14, 15, 16, 17, 18, 19, 20, 21 or 22 further comprising means for immediately subjecting the confection to a cryogenic liquid, whereby the surface of the extruded confection is frozen.

* * * * *